United States Patent
Johnston

(10) Patent No.: US 10,803,048 B2
(45) Date of Patent: Oct. 13, 2020

(54) CHANGE DATA CAPTURE PROCESSING AND ANALYSIS

(71) Applicant: Oracle International Corporation, Redwood Shores, CA (US)

(72) Inventor: Richard Johnston, Ontario (CA)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 422 days.

(21) Appl. No.: 15/707,114

(22) Filed: Sep. 18, 2017

(65) Prior Publication Data
US 2018/0081924 A1     Mar. 22, 2018

Related U.S. Application Data

(60) Provisional application No. 62/396,053, filed on Sep. 16, 2016.

(51) Int. Cl.
| | |
|---|---|
| *G06F 16/23* | (2019.01) |
| *G06F 16/27* | (2019.01) |
| *G06F 9/54* | (2006.01) |

(52) U.S. Cl.
CPC .......... *G06F 16/2358* (2019.01); *G06F 9/547* (2013.01); *G06F 16/2365* (2019.01);
(Continued)

(58) Field of Classification Search
CPC .. G06F 16/2358; G06F 16/275; G06F 16/278; G06F 16/2365; G06F 16/2379; G06F 9/547
(Continued)

(56) References Cited

U.S. PATENT DOCUMENTS

| 6,499,036 B1 * | 12/2002 | Gurevich | G06F 9/542 |
| | | | 707/778 |
| 6,622,152 B1 * | 9/2003 | Sinn | G06F 11/2074 |
| | | | 707/637 |

(Continued)

OTHER PUBLICATIONS

Oracle GoldenGate for DB2 for i, Installation and Setup Guide, Release 11.2.1.0.2, Aug. 2012, 74 pages.
(Continued)

*Primary Examiner* — Michael Pham
(74) *Attorney, Agent, or Firm* — Kilpatrick Townsend & Stockton LLP

(57) ABSTRACT

The present disclosure relates generally to electronic data, and more particularly, to techniques for capturing change data of a database by a remote system. In various embodiments, a technique includes executing, on a first computing system, an application that is configured to obtain information including data records change data of the data records from a database of a second computing system. The database stores one or more transaction logs and the change data is obtainable from the one or more transaction logs. The technique further includes sending, by the first computing system, a request to obtain the information from the database. The request includes a function to execute a stored procedure or a user-defined function on the second computing system that performs a read of the change data. The technique further includes receiving, by the first computing system, the information obtained from the database.

19 Claims, 6 Drawing Sheets

(52) U.S. Cl.
CPC ........ *G06F 16/2379* (2019.01); *G06F 16/275* (2019.01); *G06F 16/278* (2019.01)

(58) Field of Classification Search
USPC .......................................................... 707/703
See application file for complete search history.

(56) References Cited

U.S. PATENT DOCUMENTS

| | | | | |
|---|---|---|---|---|
| 8,666,942 | B2* | 3/2014 | Ngo .................... | G06F 11/1471 707/634 |
| 2006/0117091 | A1* | 6/2006 | Justin .................. | G06F 11/3476 709/217 |
| 2006/0129611 | A1 | 6/2006 | Adkins et al. | |
| 2009/0106196 | A1* | 4/2009 | Gutlapalli ........... | G06F 16/2358 |
| 2009/0217274 | A1 | 8/2009 | Corbin et al. | |
| 2010/0257138 | A1* | 10/2010 | Wang .................. | G06F 16/2358 707/634 |
| 2012/0030172 | A1 | 2/2012 | Pareek et al. | |
| 2012/0254120 | A1 | 10/2012 | Fang et al. | |
| 2015/0227572 | A1* | 8/2015 | Gottwald ............ | G06F 16/2358 707/611 |
| 2015/0278329 | A1* | 10/2015 | Hrle ........................ | G06F 16/27 707/615 |
| 2016/0217159 | A1* | 7/2016 | Dahan .................. | G06F 16/256 |
| 2016/0308963 | A1* | 10/2016 | Kung .................. | G06F 16/2358 |
| 2017/0091086 | A1 | 3/2017 | Davis et al. | |

OTHER PUBLICATIONS

U.S. Appl. No. 15/707,586, Notice of Allowance dated Jun. 13, 2019, 10 pages.

IBM Knowledge Center, "IBM data server client and drive types", retrieved Apr. 5, 2018 from https://www.ibm.com/support/knowledgecenter/SSEPGG_9.7.0/com.ibm.swg.im.dbclient.install.doc/doc/c0022612.html.

Oracle Integrated Cloud Applications & Platform Services, "Oracle GoldenGate", retrieved Apr. 5, 2018 from http://www.oracle.com/technetwork/middleware/goldengate/overview/index.html.

* cited by examiner

CHANGE DATA CAPTURE PROCESSING AND ANALYSIS

CROSS-REFERENCE TO RELATED APPLICATION

The present application claims priority and benefit from U.S. Provisional Application No. 62/396,053, filed Sep. 16, 2016, entitled "CHANGE DATA CAPTURE PROCESSING AND ANALYSIS," the entire content of which is incorporated herein by reference for all purposes.

BACKGROUND

The present disclosure relates generally to electronic data, and more particularly, to techniques (e.g., systems, methods, computer program products storing code or instructions executable by one or more processors) for capturing change data of a database by a remote system.

Traditionally the capturing of transactional information from a database for actions being taken by an application, for example an enterprise application, involves running a change data capture process, which is a set of software design patterns used to determine (and track) the data that has changed so that the action can be taken using the changed data rather than outdated data. Conventionally change data capture processes read a transaction log to determine whether the data that has changed on the same system that an application is taking action on the captured transactional information, and thus provide a same platform homogeneous software solution for change data capture. On certain operating systems (for example the IBM z/OS® operating system) this is the only way under which the transaction data may be captured and processed.

In certain instances it may be preferable to have an application take action on captured transactional information from a system that is remote from the system comprising the database and the transaction log, and thus provide a multi-platform software solution for change data capture. For example, in the case of certain operating systems (or example the IBM z/OS® operating system), the end users are billed by the processing resources that they consume, which can be a significant cost to them. Consequently, in such an instance, it may make sense to perform all or a portion of the processing for the action being taken on the captured transactional information from a remote system. However, since not all operating systems provide the same subset of services, or the same subset of services providing the services in a compatible way, for certain platforms such as the IBM z/OS® operating system, maintaining a multi-platform heterogeneous software solution for change data capture (e.g., capturing change data of a database by a remote system) can be problematic, requiring much more platform specific code that necessitates extra support and maintenance beyond the normal requirements for other systems. Therefore, techniques for capturing change data of a database by a remote system is desired.

SUMMARY

In various embodiments, a computer-implemented method is provided for that includes executing a first program on a first system. The first program configured to receive information from a second system. The first system executes a first operating system (OS), and the second system executes a second OS different from the first OS. The second system including a database storing one or more database transaction logs. The method further includes receiving, by the first program, information from at least one database transaction log from the one or more database transaction logs using a stored procedure or a user-defined function, the stored procedure invocable by the first program and executed on the second system.

In some embodiments, the receiving comprises sending, by the first program, to the second program, an information request requesting information from the one or more database transaction logs, and using, by the second program, the stored procedure or a user-defined function to collect the information from the one or more database transaction logs in the database via an application program interface (API). In certain embodiments, the second OS is z/OS® operating system, and the first OS is a non-z/OS® operating system. Optionally, the non-z/OS® operating system is a UNIX, LINUX, or z/LINUX operating system.

In some embodiments, a computer-implemented method is provided for capturing database transaction log records from a DB2® database for the z/OS® operating system. The method includes providing Structured Query Language (SQL) stored procedures to provide access to a Instrumentation Facility Interface (IFI) function identified as instrumentation facility component identifier (IFCID) 0306 utilized to read the database transaction logs from the DB2® database, and allowing remote connections from any platform that can connect to the DB2® database when the stored procedures are invoked.

In some embodiments, reading the one or more database transaction logs enables the offloading of workload from the z/OS® operating system. In certain embodiments, the method further includes enabling distributed processing of the DB2® database transaction logs across various operating systems.

In various embodiments, a system is provided for that includes one or more processors and non-transitory machine readable storage medium and program instructions to execute, on a first computing system, an application that is configured to obtain information including data records from a database of a second computing system. The first computing system runs a first operating system and the application is executed via the first operating system. The second computing system runs a second operating system that is different from the first operating system. The database stores one or more transaction logs and the information further includes change data of the data records obtainable from the one or more transaction logs. The system further includes program instructions to send, by the first computing system, a request to obtain the information from the database. The request includes a function to execute a stored procedure or a user-defined function on the second computing system that performs a read of the change data of the data records obtainable from the one or more transaction logs. The system further includes program instructions to receive, by the first computing system, the information obtained from the database. The stored procedure or the user-defined function is invoked (i.e., invoking, activating, or calling a function or routine in a program) by the application and executed on the second computing system. The program instructions are stored on the non-transitory machine readable storage medium for execution by the one or more processors.

In some embodiments, the stored procedure or the user-defined function is a two part procedure including a first stored procedure that initializes an extract process by gathering environmental information about the database and a second stored procedure that performs the read of the change data of the data records obtainable from the one or more transaction logs.

In some embodiments, the application is ORACLE® GoldenGate software package, and the first operating system is a UNIX, LINUX, or z/LINUX operating system. In certain embodiments, the database is DB2® database, and the second operating system is z/OS® operating system. Optionally, the stored procedure or the user-defined function exposes use of Instrumentation Facility Interface (IFI) function identified as instrumentation facility component identifier (IFCID) 0306 for use remotely by the application to acquire access to and the read of the change data of the data records obtainable from the one or more transaction logs stored by the DB2® database.

In some embodiments, the system further comprises program instructions to provision the stored procedure or the user-defined function on the second computing system, wherein the stored procedure or the user-defined function utilize Structured Query Language (SQL) statements and interfaces to communicate with the database. In certain embodiments, the system further comprises program instructions to update a portion of the data records in a database instance based on the change data obtained from the one or more transaction logs. Optionally, one or more transaction logs are exposed through one or more application program interfaces (APIs) to the stored procedure or the user-defined function on the second computing system.

In various embodiments, a non-transitory machine readable storage medium having instructions stored thereon is provide for that when executed by one or more processors cause the one or more processors to perform a method comprising executing, on a first computing system, an application that is configured to obtain information including data records from a database of a second computing system. The first computing system runs a first operating system and the application is executed via the first operating system. The second computing system runs a second operating system that is different from the first operating system. The database stores one or more transaction logs and the information further includes change data of the data records obtainable from the one or more transaction logs. The method further comprises sending, by the first computing system, a request to obtain the information from the database. The request includes a function to execute a stored procedure or a user-defined function on the second computing system that performs a read of the change data of the data records obtainable from the one or more transaction logs. The method further includes receiving, by the first computing system, the information obtained from the database. The stored procedure or the user-defined function is invoked by the application and executed on the second computing system.

In various embodiments, a computer implemented method is provided for comprising executing, on a first computing system, an application that is configured to obtain information including data records from a database of a second computing system. The first computing system runs a first operating system and the application is executed via the first operating system. The second computing system runs a second operating system that is different from the first operating system. The database stores one or more transaction logs and the information further includes change data of the data records obtainable from the one or more transaction logs. The method further comprises sending, by the first computing system, a request to obtain the information from the database. The request includes a function to execute a stored procedure or a user-defined function on the second computing system that performs a read of the change data of the data records obtainable from the one or more transaction logs. The method further includes receiving, by the first computing system, the information obtained from the database. The stored procedure or the user-defined function is invoked by the application and executed on the second computing system.

DETAILED DESCRIPTION

I. Introduction

Figure 1:
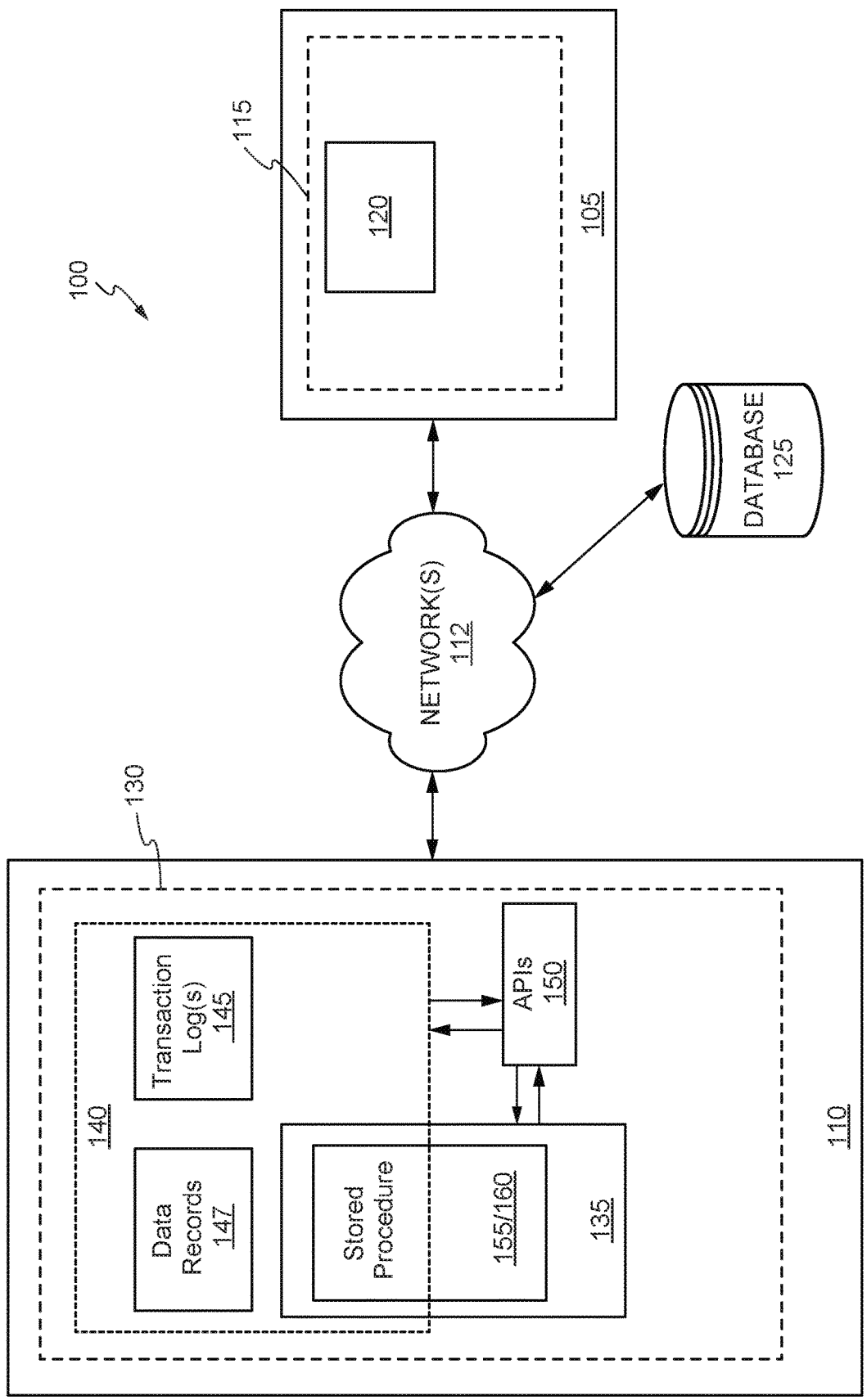
FIG. 1 illustrates a block diagram of a system environment at a high level according to various embodiments.

The following disclosure describes techniques for capturing change data of a database for use by an application, for example, an enterprise application such as Oracle's GoldenGate software package for real-time data integration and replication (i.e., ORACLE® GoldenGate). In some instances, it is advantageous to have the application take action on the captured change data from within a multi-platform architecture in which the captured change data of the database is accessed via a remote system. For example, in certain instances, it may not be cost-effective for customers to run processes of the application on the database computing device locally, for example on the IBM DB2® database for the z/OS® operating system. However, since not all operating systems provide the same subset of services, or the same subset of services providing the services in a compatible way, for certain platforms such as the IBM z/OS® operating system, maintaining a multi-platform heterogeneous software solution for change data capture (e.g., capturing change data of a database by a remote system) can be problematic, requiring much more platform specific code that necessitates extra support and maintenance beyond the normal requirements for other systems.

For example and with respect to the IBM DB2® database for the z/OS® operating system, an IBM Instrumentation Facility Interface (IFI) function identified as instrumentation facility component identifier (IFCID) 0306 is used by applications to read the transaction log of the IBM DB2® database. IFI is a component of the IBM DB2® database for the z/OS® operating system and allows for the use of IFCID 0306 to read log data. Specifically, the IFI can request DB2® database via IFCID 0306 to extract transaction log records, which may include decompressing log records if compressed, and passing them to the return area of the IFI component. The complete transaction log records are typically returned, and may include log records from achieved data sets. In order to use IFCID 0306 conventionally an IFI read call is issued locally, for example, CALL DSNWLI (READS, ifca, return_area,ifcid_area,qual_area) using data replication products that run on the IBM z/OS® operating system, otherwise called Change Data Capture (CDC) products. These data replication products have been conventionally required to run directly on the IBM z/OS® operating system where the IBM DB2® database is located. This requirement stems from there being no way to access the transaction log records from the IBM z/OS® operating system without being able to call the necessary application programming interfaces (API(s)) from the IBM DB2® database, which are only exposed in local link libraries and have no provided method to access the data from a remote system.

To address these problems, various embodiments provide techniques (e.g., systems, methods, computer program products storing code or instructions executable by one or more processors) for running a stored procedure or a user-defined function on a mainframe system (e.g., the IBM z/OS® operating system) to obtain change data of data records within a database instance of the mainframe system, and running an application (e.g., an application that performs processes and provides services other than capturing change data) on another mainframe system (e.g., a server having a different operating system remote from the IBM z/OS® operating system). The processes and services provided by the application to an end user are identical to the processes and services provided by other versions of the application that are conventionally deployed on the mainframe system comprising the database instance (e.g., the IBM DB2® database for the z/OS® operating system).

In certain embodiments, a method is provided for that includes executing, on a first computing system, an application that is configured to obtain information including data records from a database of a second computing system. The first computing system runs a first operating system and the application is executed via the first operating system, the second computing system runs a second operating system that is different from the first operating system, the database stores one or more transaction logs, and the information further includes change data of the data records obtainable from the one or more transaction logs. The method further includes sending, by the first computing system, a request to obtain the information from the database. The request includes a function to execute a stored procedure or a user-defined function on the second computing system. The method further includes receiving, by the first computing system, the information obtained from the database. The stored procedure or a user-defined function exposes the use of the IBM IFI function IFCID 0306 for use remotely by the application to acquire access to and read the one or more transaction logs of the IBM DB2® database. In certain embodiments, the stored procedure or a user-defined function is a two part procedure including a first stored procedure that initializes an extract process by gathering information about the database being accessed and a second stored procedure that performs the actual reading of the change data of the data records obtainable from the one or more transaction logs.

Advantageously, executing the application on a remote first computing system for actions performed on data records and executing the stored procedure on the second computing system for capturing the change data of the data records allows for extra support and development maintenance costs conventionally spent on maintaining the application on the second computing system to be minimized. Also advantageously, computing resources consumed in performance of the actions on the remote first computing system are not chargeable by the owner of the second computing system to the end user of the application, thereby saving the end user a significant source of ongoing cost due to the operation of the application.

II. System Architecture for the Capture of Change Data

FIG. 1 illustrates a block diagram of a system environment 100 at a high level according to various embodiments. The system includes a first computing system 105 (e.g., a remote computing system) and a second computing system 110 (e.g., a mainframe system different from the remote computing system) in communication via network(s) 112. The first computing system 105 and the second computing system 110 may comprise one or more computers and/or servers, which may be general purpose computers, specialized server computers (including, by way of example, PC servers, UNIX, LINUX, or z/LINUX servers, mid-range servers, mainframe computers, rack-mounted servers, etc.), server farms, server clusters, or any other appropriate arrangement and/or combination. The computing devices that make up the first computing system 105 and the second computing system 110 may run one or more operating systems and/or a variety of additional server applications and/or mid-tier applications, including HTTP servers, FTP servers, CGI servers, Java servers, database servers, and the like. Exemplary database servers include without limitation those commercially available from Oracle, Microsoft, Sybase, IBM and the like. In some embodiments, the first computing system 105 is running a first operating system 115, for example, LINUX such as Intel 64-bit LINUX, UNIX such as IBM 64-bit AIX, or z/LINUX such as z/LINUX 64-bit. The first operating system 115 may be utilized to execute one or more applications 120 and is in communication via network 112 with a target database 125. The second computing system 110 is running a second operating system 130 that is different from the first operating system 115, for example, the IBM z/OS® operating system. The second operating system 130 may be utilized to execute one or more applications 135 (different from the one or more applications 120) and is in communication with a source database 140 (e.g., the IBM DB2® database).

Network(s) 112 may facilitate communications and exchange of data between the first computing system 105, the second computing system 110, and the target database 125. Network 120 may be any type of network familiar to those skilled in the art that can support data communications using any of a variety of commercially-available protocols, including without limitation TCP/IP, SNA, IPX, AppleTalk, and the like. Merely by way of example, network 112 can be a local area network (LAN) such as an Ethernet network, a Token-Ring network and/or the like, a wide-area network, a virtual network, including without limitation a virtual private network (VPN), the Internet, an intranet, an extranet, a public switched telephone network (PSTN), an infra-red network, a wireless network (e.g., a network operating under any of the IEEE 802.1X suite of protocols, the Bluetooth protocol known in the art, and/or any other wireless protocol), and/or any combination of these and/or other networks.

In various embodiments, the first operating system 115 is a LINUX, UNIX, or z/LINUX operating system. As should be understood by those of ordinary skill in the art, the first operating system 115 manages the communication between the software and the hardware of the first operating system 105. The LINUX open source operating system, or LINUX OS, is a freely distributable, cross-platform operating system based on UNIX that can be installed on PCs, laptops, netbooks, mobile and tablet devices, video game consoles, servers, supercomputers and more. The LINUX OS is frequently packaged as a LINUX distribution for both desktop and server use, and includes the LINUX kernel (the core of the operating system) as well as supporting tools and libraries. Past LINUX OS distributions include Debian, Ubuntu, Fedora, Red Hat and openSUSE. The UNIX multitasking and multiuser computer operating systems, or UNIX OS, is derived from the original AT&T UNIX operating systems. The UNIX OS includes the UNIX kernel (the core of the operating system) as well as supporting tools and libraries. Past UNIX OS distributions include AIS, BSD, HP-UX, Solaris, and Iris. The z/LINUX, or z/LINUZ OS, is the collective term for the LINUX operating system compiled to run on IBM mainframes, especially IBM z Systems and IBM LinuxONE servers. The z/LINUZ OS includes the z/LINUX kernel (the core of the operating system) as well as supporting tools and libraries.

In various embodiments, the second operating system 130 is the z/OS® operating system. The z/OS® operating system is a 64-bit operating system for IBM mainframes, produced by IBM that supports Java, C, C++, and UNIX (Single UNIX Specification) API(s) and applications through UNIX System Services. The z/OS® operating system derives from and is the successor to OS/390 operating system, which in turn followed a string of multiple virtual storage (MVS) operating system versions. The z/OS® operating system can communicate directly via TCP/IP, including IPv6, and includes standard HTTP servers (one from Lotus, the other Apache-derived) along with other common services such as FTP, NFS, and CIFS/SMB. The present version of z/OS® operating system is the z/OS® V2.3 operating system.

In various embodiments, the source database 140 is the IBM DB2® database for the z/OS® operating system. The IBM DB2® database contains database server products developed by IBM. These database server products all support the relational model, but in recent years some products have been extended to support object-relational features and non-relational structures like JSON and XML The database server products for the latest version DB2 12 are built on the core capabilities of DB2 11. The source database 140 may include one or more transaction logs 145 (also called a transaction journal, database log, binary log, or audit trail), which can be exposed through one or more application program interfaces (APIs) 150. The one or more transaction logs 145 is a history of actions executed by a database management system used to guarantee Atomicity, Consistency, Isolation, Durability (ACID) properties over crashes or hardware failures. Physically, the one or more transaction logs 145 is a file listing changes (e.g., change data) to the source database 140, stored in a stable storage format.

In various embodiments, the one or more applications 120 include an enterprise application such as ORACLE® GoldenGate software package. The ORACLE® GoldenGate software package enables the exchange and manipulation of data at the transaction level among multiple, heterogeneous platforms across an enterprise. In some embodiments, the application such as ORACLE® GoldenGate software package may be configured for one or more purposes including (i) static extraction of data records from a database and the loading of those records to another database, (ii) continuous extraction and replication of transactional Data Manipulation Language (DML) operations and data definition language (DDL) changes (for supported databases) to keep source and target data consistent, and (iii) extraction of data records from a database and replication of the data records to a file outside the database. The extraction processes may capture source tables or a static set of record data 147 directly from source objects (e.g., an initial load), data from database recovery logs, data from transaction logs 145 (e.g., logs that include change data such that the obtained static set of data can be synchronized with another set of the data), and associated metadata. When configured for change synchronization, the extraction processes capture the DML and DDL operations that are performed on objects in the extract configuration. The extract processes may store these operations until it receives commit records or rollbacks for the transactions that contain them. When a rollback is received, the extract processes discard the operations for that transaction. When a commit is received, the extract processes persist the transaction to disk in a series of files called a trail, where it is queued for propagation to the target system. All of the operations in each transaction are written to the trail files as a sequentially organized transaction unit. The trail files may then be pumped to a target system (e.g., an enterprise system). As the trail files come into the target system, they may be distributed to the target database 125 and applied to target record data.

In various embodiments, the one or more applications 135 include a stored procedure 155 that runs on the second computing system 110. In certain embodiments, the stored procedure 155 includes a first stored procedure that initializes an extract process by gathering environmental information about the source database 140 being accessed and a second stored procedure that performs the actual reading of the change data of the data records obtainable from the one or more transaction logs. The environmental information gathered concerning the source database 140 may include the database version, pointer to the z/OS® shared storage that the stored procedure or user function uses to store the transaction log data in and the size of it, and database subsystem name. In other embodiments, a user-defined function 160 is utilized instead of the stored procedure 155. For example, a user defined function may be used instead of a stored procedure if it is desired to operate using the extra facilities provided by the IBM DB2® database with regard the initialization, calling and termination of the user defined function calls. The user-defined function 160 includes a first user-defined function that initializes an extract process by gathering information about the source database 140 being accessed and a second user-defined function that performs the actual reading of the change data of the data records obtainable from the one or more transaction logs 145.

In various embodiments, the stored procedure 155 or the user-defined function 160 is a separately compiled application that is part of the source database 140 and is compiled for the computing system 110 on which it is executing. The stored procedure 155 or the user-defined function 160 utilize Structured Query Language (SQL) statements and interfaces to communicate with the source database 140. The SQL statements and interfaces may be used to perform tasks such as obtain environmental information concerning the source database 140 and execute a read of the change data of the data records obtainable from the one or more transaction logs 145. The SQL statements and interfaces may also be used to send the change data out over TCP/IP to the first computing system 105 as a custom protocol using the network 112. With the stored procedure 155 or the user-defined function 160, a user on the first computing system 105 that has a connection with the second computing system 110 (and optionally the correct privileges) is able to obtain access to the one or more transaction logs 145 via the APIs 150.

As shown in FIG. 1, instead of running the one or more applications 120 (e.g., ORACLE® GoldenGate software package) on the second computing system (e.g., the IBM z/OS® operating system), various embodiments provide for the one or more applications 120 to be running on the first computing system 105 (e.g., a UNIX, LINUX, or z/LINUX operating system), which is remote from the second computing system 110. In some embodiments, the one or more applications 120 can invoke the stored procedure 155 or the user-defined function 160 on the second computing system 110, and the stored procedure 155 or the user-defined function 160 can call the APIs 150 to gather information about the source database 140 (e.g., the IBM DB2® database) on the second computing system 110. The one or more applications 120 running on the first computing system 105 may then have access to the one or more transaction logs 145, and the stored procedure 155 or the user-defined function 160 can call the APIs 150 to read the change data of the data records from the one or more transaction logs 145 stored in the source database 140 (e.g., the IBM DB2® database) on the second computing system 110. In accordance with the various aspects discussed herein, the one or more applications 120 need not be tied to the second operating system 130 on the second computing system 110. For example, the one or more applications 120 can run on the first operating system 115 of the first computing system 105, while still being able to extract information from the second computing system 110 (e.g., the z/OS operating system) by invoking the stored procedure 155 or the user-defined function 160 on the second computing system 110.

III. Methods for the Capture of Change Data

Figure 2:
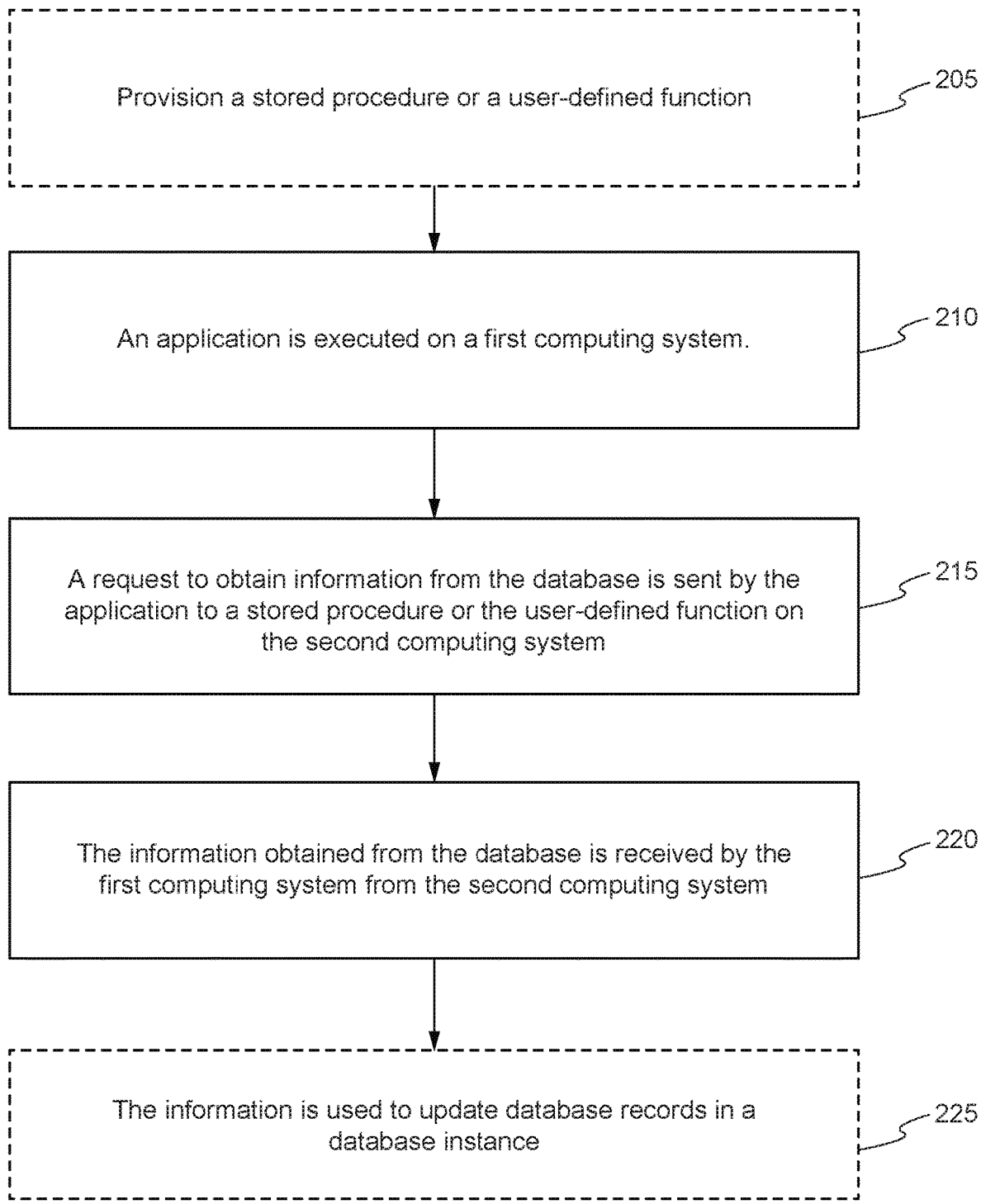
FIG. 2 illustrates a process for using a stored procedure or user defined function to facilitate the collection of database change data from remote database instance logs in accordance with various embodiments.
Figure 3:
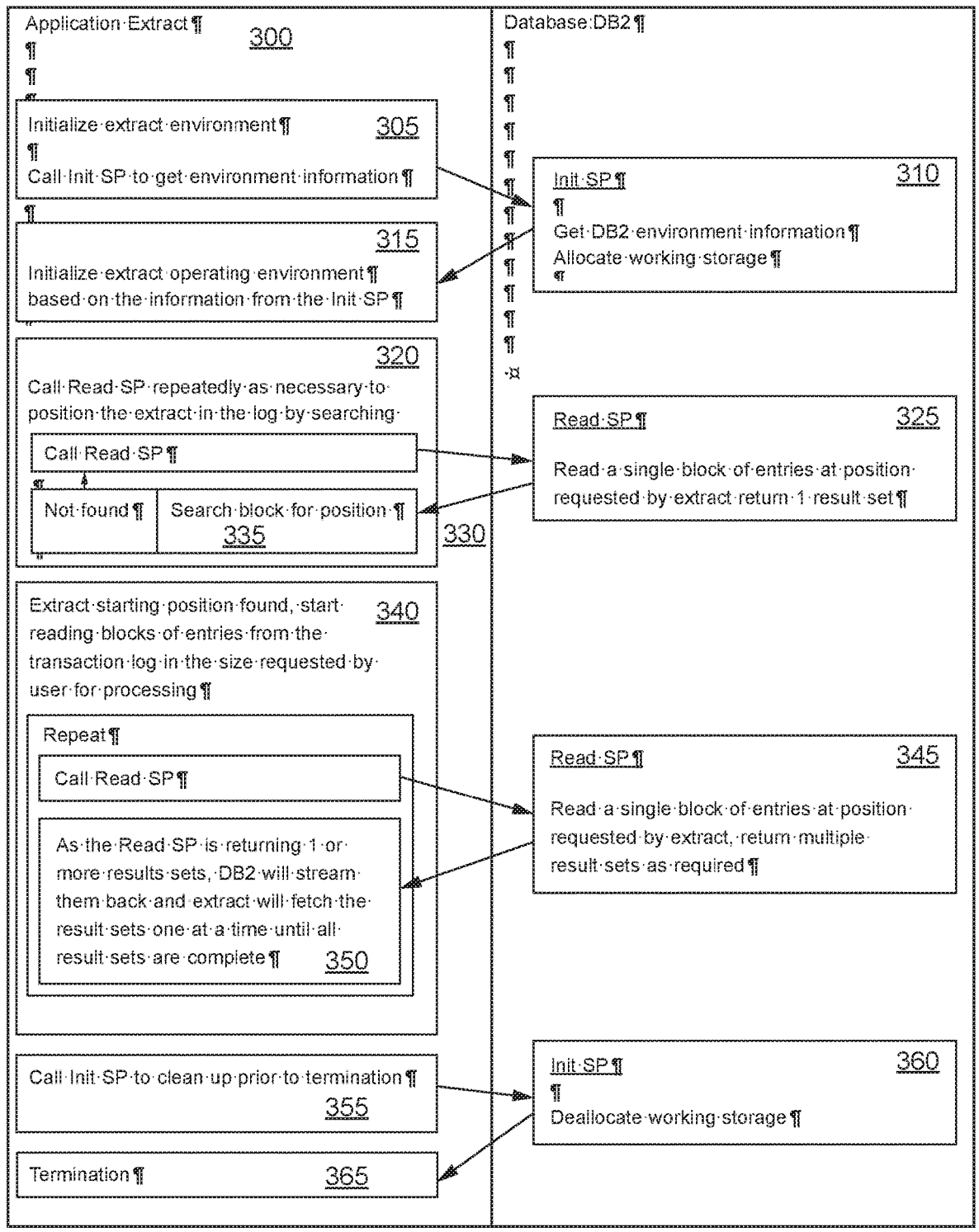
FIG. 3 illustrates a code flow for remote log reading in accordance with various embodiments.

FIGS. 2 and 3 illustrate techniques for capturing change data from remote database instance logs in accordance with various embodiments. Individual embodiments may be described as a process which is depicted as a flowchart, a flow diagram, a data flow diagram, a structure diagram, or a block diagram. Although a flowchart may describe the operations as a sequential process, many of the operations may be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination may correspond to a return of the function to the calling function or the main function.

The processes and/or operations depicted by in FIGS. 2 and 3 may be implemented in software (e.g., code, instructions, program) executed by one or more processing units (e.g., processors cores), hardware, or combinations thereof. The software may be stored in a memory (e.g., on a memory device, on a non-transitory computer-readable storage medium). The particular series of processing steps in FIGS. 2 and 3 is not intended to be limiting. Other sequences of steps may also be performed according to alternative embodiments. For example, in alternative embodiments the steps outlined above may be performed in a different order. Moreover, the individual steps illustrated in FIGS. 2 and 3 may include multiple sub-steps that may be performed in various sequences as appropriate to the individual step. Furthermore, additional steps may be added or removed depending on the particular applications. One of ordinary skill in the art would recognize many variations, modifications, and alternatives FIG. 2 shows a flowchart that illustrates a process 200 for using a stored procedure or user defined function to facilitate the collection of database change data from remote database instance logs in accordance with various embodiments. In some embodiments, an application may invoke a stored procedure or user-defined function (as part of the application) to obtain the desired logs. As described, a stored procedure or user-defined function may be a separately compiled application that is part of the database and is compiled for the computing device on which it is executing. The stored procedure or user-defined function may use the API to capture the data. As such, any application connected to the computing system and/or the database (optionally with the correct privileges) may be able to obtain access to the log data through invoking the stored procedure or user-defined function. Since the stored procedure or user-defined function are part of the database itself and not a separate application, another application (e.g., an SAP application) may also utilize the stored procedure or user-defined function to obtain data from the database.

At optional step 205, a stored procedure or a user-defined function comprising SQL stored procedures is provisioned to provide access to one or more interfaces required to read one or more transaction logs on a database. In some embodiments, the stored procedure or the user-defined function is provisioned onto a local mainframe or computing system. At step 210, an application (e.g., an enterprise application such as ORACLE® GoldenGate software package) is executed on a first computing system (e.g., the first computing system 105 as described with respect to FIG. 1). The application can be configured to obtain information including data records from a database (e.g., the IBM DB2® database) of a second computing system (e.g., the local mainframe or the computing system 110 as described with respect to FIG. 1). The first computing system may run a first operating system (e.g., a UNIX, LINUX, or z/LINUX operating system) and the application is executed via the first operating system, and the second computing system may run a second operating system (e.g., the IBM z/OS® operating system) that is different from the first operating system. The database stores one or more transaction logs, and the information further includes change data of the data records obtainable from the one or more transaction logs.

At step 215, a request to obtain information from the database is sent by the application to the stored procedure or the user-defined function on the second computing system. The request may include a function to execute the stored procedure or a user-defined function. The stored procedure or the user-defined function may be a separately compiled application that is part of the database and is compiled for the second computing system on which it is executing. In some embodiments, the stored procedure or user-defined function exposes the use of a function (e.g., the IBM IFI function IFCID 0306) via API for use remotely by the application to acquire access to and read the one or more transaction logs of the database. In certain embodiments, the stored procedure or user-defined function is a two part procedure including: (i) a first stored procedure that utilizes SQL statements and interfaces to initialize an extract process by communicating with the database and gathering environmental information about the database, and (ii) a second stored procedure that utilizes SQL statements and interfaces to communicate with the database and perform the actual reading of the change data of the data records obtainable from the one or more transaction logs. At step 220, the information obtained from the database is received by the first computing system from the second computing system. The information includes the change data of the data records obtainable from the one or more transaction logs. Optionally, at step 225, the information is used to update database records in a database instance. The change data received at the first computing system may be used by the application to update database records in a database instance that is on the first computing system or remote from the first computing system.

As described, in some embodiments, the stored procedure or user-defined function provides the ability for an application to access the log data stored at the database by communicating with the API. The stored procedure or user-defined function may act as a "wrapper" around the native local interfaces that need to run on a mainframe or computing device of a local computing system. An application on a remote computing system may then obtain log data via the wrapper without requiring any changes to be made on the mainframe or computing device of a local computing system. Some embodiments, using for example the stored procedure or user-defined function, may reside on the mainframe or computing device of a local computing system to read, capture, and send the log data to the remote computing system. Users may install an external program on their remote machines and invoke the stored procedure or user-defined function. By doing so, the users may access any kind of action or log change data on the mainframe or computing device of a local computing system without having to write any mainframe specific executable or application that runs on the mainframe.

Advantageously, by utilizing an enterprise application such as ORACLE® GoldenGate software package on a remote device that then invokes the stored procedure or user-defined function to access the log files, the number of CPU cycles running on the mainframe is drastically reduced (e.g., more than 90% reduction). The amount of code that is needed to be run on the mainframe is now less than one or two percentage of the total code that would have had to be running on the mainframe in a conventional system.

FIG. 3 shows a flowchart that illustrates a code flow 300 for remote log reading in accordance with various embodiments. While conventionally the API for accessing the log data of a database was called with the IBM IFI function IFCID 0306 by the application running on the IBM z/OS® operating system of the local mainframe, various embodiments described herein enable an application running on a UNIX, LINUX, or z/LINUX operating system of a remote system to invoke a stored procedure or user-defined function, which then calls the API with the IBM IFI function IFCID 0306 on behalf of the application.

In order to invoke the stored procedure or user-defined function, at step 305, an extract environment function (Extract(i)) is initialized and the stored procedure or user-defined function (Init SP) on the local mainframe is called from the application on a remote system to get environment information about the database instance. At step 310, the stored procedure or user-defined function (Init SP) on the local mainframe receives the call and executes a first stored procedure (GET procedure) that initializes the extract process by gathering the environmental information about the database instance being accessed. In some embodiments, the stored procedure or user-defined function also allocates working storage, for example, the ECSA key 7 storage or in the 64-bit common key 7 storage area above the 2-GB bar, required for use in calling the API using the IBM IFI function IFCID 0306 to read the transaction log records. The stored procedure or user-defined function (Init SP) on the local mainframe forwards the environmental information about the database instance to the application on the remote system.

At step 315, the application on the remote system receives the environmental information about the database instance and initializes an extract operating environment function (Extract(ii)) based on the received environmental information to capture change data from the database instance. At step 320, the extract operating environment function (Extract(ii)) may set the position of the extract by performing a search through the transaction log using the starting position of the extract. This may be accomplished by: (i) calling the stored procedure or user-defined function (Read SP), (ii) requesting the stored procedure or user-defined function (Read SP) at step 325 to read a small amount of capture change data from the log using a second stored procedure (READ procedure), (iii) forwarding the small amount of capture change data to the application at step 330. The extract operating environment function (Extract(ii)) may receive the small amount of capture change data at step 335, and inspect the position information to determine the position of the extract. In some embodiments, the extract operating environment function (Extract(ii)) performs a looping operation (calling the stored procedure or user-defined function (Read SP) for updated position information continuously) until the correct position is found.

At step 340, once the correct position is found, the extract operating environment function (Extract(ii)) will call the stored procedure or user-defined function (Read SP) requesting the capture change data in a block size up to the max size defined by the user. In some embodiments, the stored procedure or user-defined function (Read SP) will receive the call at step 345, execute the second stored procedure (READ procedure) that performs the actual reading of the change data of the data records obtainable from the transaction log, and return multiple result sets at step 350 as appropriate with small pieces of the capture change data until all the capture change data has been consumed from the requested read. This may allow the database to stream the capture change data in the background back to the application on the remote system and overlap some of the I/O. This read process can continue until program termination. At step 355, on program termination, the stored procedure or user-defined function (Init SP) on the local mainframe is called again to deallocate the working storage and extract ends. At step 360, the stored procedure or user-defined function (Init SP) deallocates the working storage and extract ends. At step 365, the program terminates. The code flow 300 shows code that will attempt to deallocate the working storage on the local mainframe in an abnormal termination scenario. In certain embodiments, attempting to deallocate the working storage on the local mainframe in an abnormal termination scenario is not part of the normal code flow, but may be part of the extract.

Advantageously, methods and systems of reading the database transaction logs in accordance with the various embodiments discussed herein can significantly reduce the billed Millions of Instructions per Second (MIPs) cost as virtually all application processing may be offloaded from the mainframe system. All running application processes may be managed in UNIX/LINUX/z/LINUX based operating environments that are already familiar to most IT departments. Access to the DB2® database for the z/OS® operating system transaction log through standard SQL interfaces can eliminate the need for low level technical expertise in IBM z/OS® and DB2® for z/OS® APIs. The transaction log API accessed through any database connection also allows for flexibility in reading the transaction log from any platform capable of connecting to the DB2® database for the z/OS® operating system.

Figure 4:
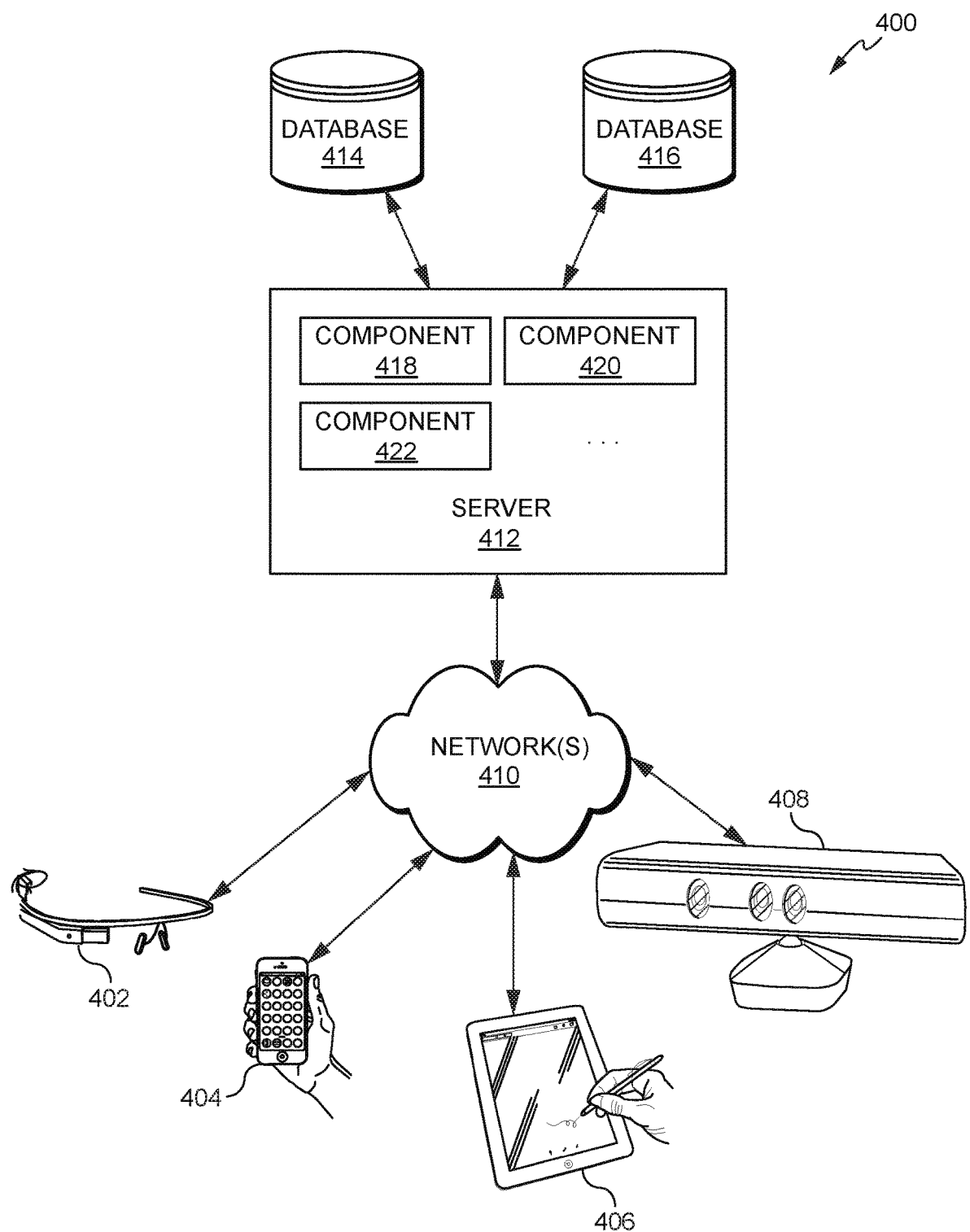
FIG. 4 depicts a simplified diagram of a distributed system for implementing various embodiments.

FIG. 4 depicts a simplified diagram of a distributed system 400 for implementing an embodiment. In the illustrated embodiment, distributed system 400 includes one or more client computing devices 402, 404, 406, and 408, which are configured to execute and operate a client application such as a web browser, proprietary client (e.g., Oracle Forms), or the like over one or more network(s) 410. Server 412 may be communicatively coupled with remote client computing devices 402, 404, 406, and 408 via network 410.

In various embodiments, server 412 may be adapted to run one or more services or software applications such as services and applications that provide the document (e.g., webpage) analysis and modification-related processing. In certain embodiments, server 412 may also provide other services or software applications that can include non-virtual and virtual environments. In some embodiments, these services may be offered as web-based or cloud services or under a Software as a Service (SaaS) model to the users of client computing devices 402, 404, 406, and/or 408. Users operating client computing devices 402, 404, 406, and/or 408 may in turn utilize one or more client applications to interact with server 412 to utilize the services provided by these components.

In the configuration depicted in FIG. 4, software components 418, 420 and 422 of system 400 are shown as being implemented on server 412. In other embodiments, one or more of the components of system 400 and/or the services provided by these components may also be implemented by one or more of the client computing devices 402, 404, 406, and/or 408. Users operating the client computing devices may then utilize one or more client applications to use the services provided by these components. These components may be implemented in hardware, firmware, software, or combinations thereof. It should be appreciated that various different system configurations are possible, which may be different from distributed system 400. The embodiment shown in FIG. 4 is thus one example of a distributed system for implementing an embodiment system and is not intended to be limiting.

Client computing devices 402, 404, 406, and/or 408 may include various types of computing systems. For example, client computing devices may include portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like. The devices may support various applications such as various Internet-related apps, e-mail, short message service (SMS) applications, and may use various other communication protocols. The client computing devices may also include general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Client computing devices may also include electronic devices such as a thin-client computer, an Internet-enabled gaming system (e.g., a Microsoft Xbox® gaming console with or without a Kinect® gesture input device), and/or a personal messaging device, capable of communicating over network(s) 410.

Although distributed system 400 in FIG. 4 is shown with four client computing devices, any number of client computing devices may be supported. Other devices, such as devices with sensors, etc., may interact with server 412.

Network(s) 410 in distributed system 400 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk, and the like. Merely by way of example, network(s) 410 can be a local area network (LAN), networks based on Ethernet, Token-Ring, a wide-area network (WAN), the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol), and/or any combination of these and/or other networks.

Server 412 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 412 can include one or more virtual machines running virtual operating systems, or other computing architectures involving virtualization. One or more flexible pools of logical storage devices can be virtualized to maintain virtual storage devices for the server. Virtual networks can be controlled by server 412 using software defined networking. In various embodiments, server 412 may be adapted to run one or more services or software applications described in the foregoing disclosure. For example, server 412 may correspond to a server for performing processing as described above according to an embodiment of the present disclosure.

Server 412 may run an operating system including any of those discussed above, as well as any commercially available server operating system. Server 412 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 412 may include one or more applications to analyze and consolidate data feeds and/or event updates received from users of client computing devices 402, 404, 406, and 408. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 412 may also include one or more applications to display the data feeds and/or real-time events via one or more display devices of client computing devices 402, 404, 406, and 408.

Distributed system 400 may also include one or more databases 414 and 416. These databases may provide a mechanism for storing information such as user interactions information, usage patterns information, adaptation rules information, and other information used by embodiments of the present invention. Databases 414 and 416 may reside in a variety of locations. By way of example, one or more of databases 414 and 416 may reside on a non-transitory storage medium local to (and/or resident in) server 412. Alternatively, databases 414 and 416 may be remote from server 412 and in communication with server 412 via a network-based or dedicated connection. In one set of embodiments, databases 414 and 416 may reside in a storage-area network (SAN). Similarly, any necessary files for performing the functions attributed to server 412 may be stored locally on server 412 and/or remotely, as appropriate. In one set of embodiments, databases 414 and 416 may include relational databases, such as databases provided by Oracle, that are adapted to store, update, and retrieve data in response to SQL-formatted commands.

Figure 5:
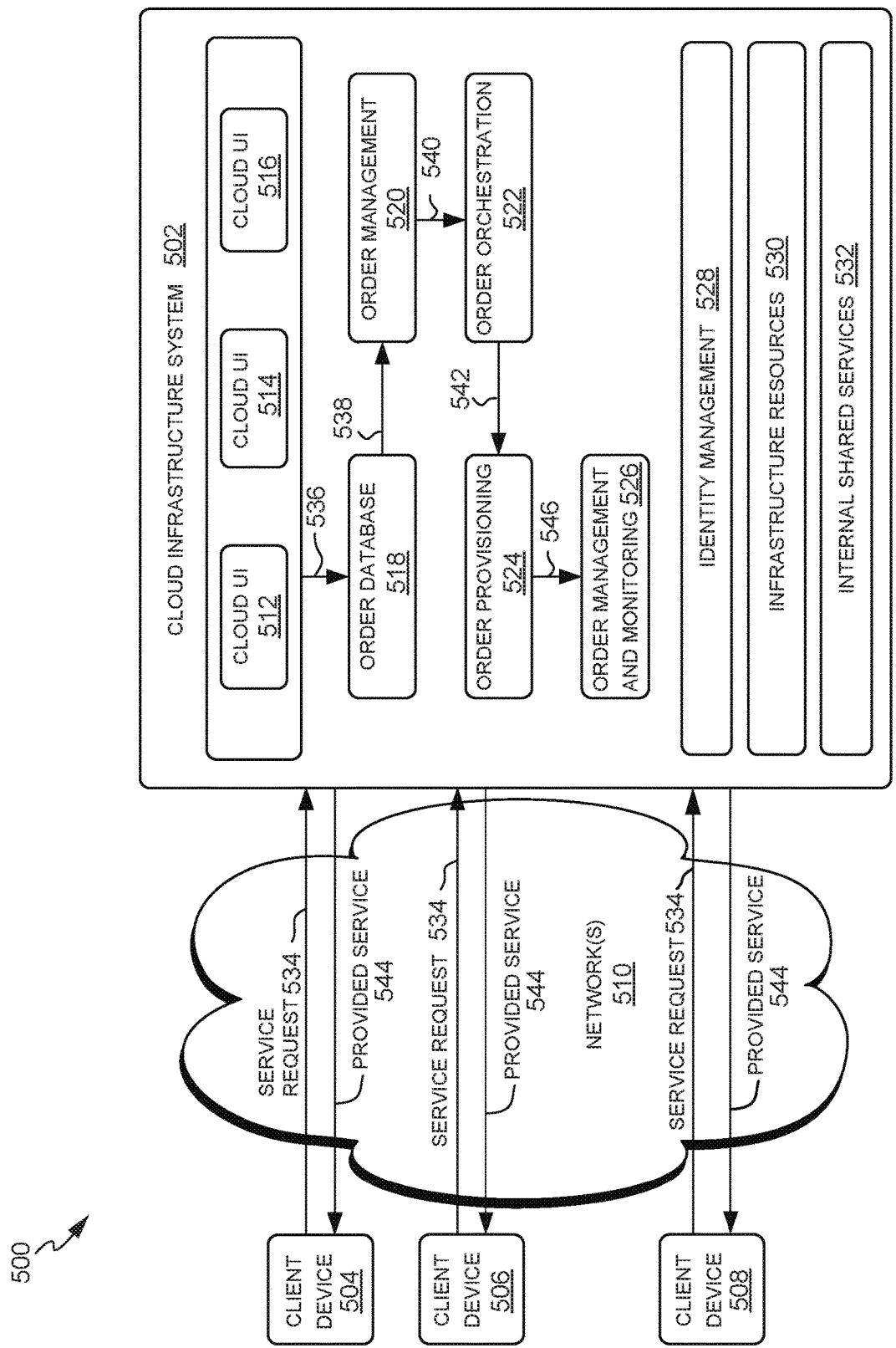
FIG. 5 is a simplified block diagram of one or more components of a system environment in which services may be offered as cloud services, in accordance with various embodiments.

In some embodiments, the document analysis and modification services described above may be offered as services via a cloud environment. FIG. 5 is a simplified block diagram of one or more components of a system environment 500 in which services may be offered as cloud services, in accordance with an embodiment of the present disclosure. In the illustrated embodiment in FIG. 5, system environment 500 includes one or more client computing devices 504, 506, and 508 that may be used by users to interact with a cloud infrastructure system 502 that provides cloud services, including services for dynamically modifying documents (e.g., webpages) responsive to usage patterns. Cloud infrastructure system 502 may comprise one or more computers and/or servers that may include those described above for server 412.

It should be appreciated that cloud infrastructure system 502 depicted in FIG. 5 may have other components than those depicted. Further, the embodiment shown in FIG. 5 is only one example of a cloud infrastructure system that may incorporate an embodiment of the invention. In some other embodiments, cloud infrastructure system 502 may have more or fewer components than shown in the figure, may combine two or more components, or may have a different configuration or arrangement of components.

Client computing devices 504, 506, and 508 may be devices similar to those described above for 402, 404, 406, and 408. Client computing devices 504, 506, and 508 may be configured to operate a client application such as a web browser, a proprietary client application (e.g., Oracle Forms), or some other application, which may be used by a user of the client computing device to interact with cloud infrastructure system 502 to use services provided by cloud infrastructure system 502. Although exemplary system environment 500 is shown with three client computing devices, any number of client computing devices may be supported. Other devices such as devices with sensors, etc. may interact with cloud infrastructure system 502.

Network(s) 510 may facilitate communications and exchange of data between clients 504, 506, and 508 and cloud infrastructure system 502. Each network may be any type of network familiar to those skilled in the art that can support data communications using any of a variety of commercially-available protocols, including those described above for network(s) 410.

In certain embodiments, services provided by cloud infrastructure system 502 may include a host of services that are made available to users of the cloud infrastructure system on demand. In addition to services related to dynamic document modification responsive usage patterns, various other services may also be offered including without limitation online data storage and backup solutions, Web-based e-mail services, hosted office suites and document collaboration services, database processing, managed technical support services, and the like. Services provided by the cloud infrastructure system can dynamically scale to meet the needs of its users.

In certain embodiments, a specific instantiation of a service provided by cloud infrastructure system 502 may be referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's website.

In certain embodiments, cloud infrastructure system 502 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

Cloud infrastructure system 502 may also provide "big data" elated computation and analysis services. The term "big data" is generally used to refer to extremely large data sets that can be stored and manipulated by analysts and researchers to visualize large amounts of data, detect trends, and/or otherwise interact with the data. This big data and related applications can be hosted and/or manipulated by an infrastructure system on many levels and at different scales. Tens, hundreds, or thousands of processors linked in parallel can act upon such data in order to present it or simulate external forces on the data or what it represents. These data sets can involve structured data, such as that organized in a database or otherwise according to a structured model, and/or unstructured data (e.g., emails, images, data blobs (binary large objects), web pages, complex event processing). By leveraging an ability of an embodiment to relatively quickly focus more (or fewer) computing resources upon an objective, the cloud infrastructure system may be better available to carry out tasks on large data sets based on demand from a business, government agency, research organization, private individual, group of like-minded individuals or organizations, or other entity.

In various embodiments, cloud infrastructure system 502 may be adapted to automatically provision, manage and track a customer's subscription to services offered by cloud infrastructure system 502. Cloud infrastructure system 502 may provide the cloud services via different deployment models. For example, services may be provided under a public cloud model in which cloud infrastructure system 502 is owned by an organization selling cloud services (e.g., owned by Oracle Corporation) and the services are made available to the general public or different industry enterprises. As another example, services may be provided under a private cloud model in which cloud infrastructure system 502 is operated solely for a single organization and may provide services for one or more entities within the organization. The cloud services may also be provided under a community cloud model in which cloud infrastructure system 502 and the services provided by cloud infrastructure system 502 are shared by several organizations in a related community. The cloud services may also be provided under a hybrid cloud model, which is a combination of two or more different models.

In some embodiments, the services provided by cloud infrastructure system 502 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 502. Cloud infrastructure system 502 then performs processing to provide the services in the customer's subscription order.

In some embodiments, the services provided by cloud infrastructure system 502 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by cloud infrastructure system 502 via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by cloud infrastructure system 502 without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 502 may also include infrastructure resources 530 for providing the resources used to provide various services to customers of the cloud infrastructure system. In one embodiment, infrastructure resources 530 may include pre-integrated and optimized combinations of hardware, such as servers, storage, and networking resources to execute the services provided by the PaaS platform and the SaaS platform, and other resources.

In some embodiments, resources in cloud infrastructure system 502 may be shared by multiple users and dynamically re-allocated per demand. Additionally, resources may be allocated to users in different time zones. For example, cloud infrastructure system 502 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 532 may be provided that are shared by different components or modules of cloud infrastructure system 502 to enable provision of services by cloud infrastructure system 502. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 502 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 502, and the like.

In one embodiment, as depicted in FIG. 5, cloud management functionality may be provided by one or more modules, such as an order management module 520, an order orchestration module 522, an order provisioning module 524, an order management and monitoring module 526, and an identity management module 528. These modules may include or be provided using one or more computers and/or servers, which may be general purpose computers, specialized server computers, server farms, server clusters, or any other appropriate arrangement and/or combination.

In an exemplary operation, at 534, a customer using a client device, such as client device 504, 506 or 508, may interact with cloud infrastructure system 502 by requesting one or more services provided by cloud infrastructure system 502 and placing an order for a subscription for one or more services offered by cloud infrastructure system 502. In certain embodiments, the customer may access a cloud User Interface (UI) such as cloud UI 512, cloud UI 514 and/or cloud UI 516 and place a subscription order via these UIs. The order information received by cloud infrastructure system 502 in response to the customer placing an order may include information identifying the customer and one or more services offered by the cloud infrastructure system 502 that the customer intends to subscribe to.

At 536, the order information received from the customer may be stored in an order database 518. If this is a new order, a new record may be created for the order. In one embodiment, order database 518 can be one of several databases operated by cloud infrastructure system 518 and operated in conjunction with other system elements.

At 538, the order information may be forwarded to an order management module 520 that may be configured to perform billing and accounting functions related to the order, such as verifying the order, and upon verification, booking the order.

At 540, information regarding the order may be communicated to an order orchestration module 522 that is configured to orchestrate the provisioning of services and resources for the order placed by the customer. In some instances, order orchestration module 522 may use the services of order provisioning module 524 for the provisioning. In certain embodiments, order orchestration module 522 enables the management of business processes associated with each order and applies business logic to determine whether an order should proceed to provisioning.

As shown in the embodiment depicted in FIG. 5, at 542, upon receiving an order for a new subscription, order orchestration module 522 sends a request to order provisioning module 524 to allocate resources and configure resources needed to fulfill the subscription order. Order provisioning module 524 enables the allocation of resources for the services ordered by the customer. Order provisioning module 524 provides a level of abstraction between the cloud services provided by cloud infrastructure system 500 and the physical implementation layer that is used to provision the resources for providing the requested services. This enables order orchestration module 522 to be isolated from implementation details, such as whether or not services and resources are actually provisioned on the fly or pre-provisioned and only allocated/assigned upon request.

At 544, once the services and resources are provisioned, a notification may be sent to the subscribing customers indicating that the requested service is now ready for use. In some instance, information (e.g. a link) may be sent to the customer that enables the customer to start using the requested services.

At 546, a customer's subscription order may be managed and tracked by an order management and monitoring module 526. In some instances, order management and monitoring module 526 may be configured to collect usage statistics regarding a customer use of subscribed services. For example, statistics may be collected for the amount of storage used, the amount of data transferred, the number of users, and the amount of system up time and system down time, and the like.

In certain embodiments, cloud infrastructure system 500 may include an identity management module 528 that is configured to provide identity services, such as access management and authorization services in cloud infrastructure system 500. In some embodiments, identity management module 528 may control information about customers who wish to utilize the services provided by cloud infrastructure system 502. Such information can include information that authenticates the identities of such customers and information that describes which actions those customers are authorized to perform relative to various system resources (e.g., files, directories, applications, communication ports, memory segments, etc.) Identity management module 528 may also include the management of descriptive information about each customer and about how and by whom that descriptive information can be accessed and modified.

Figure 6:
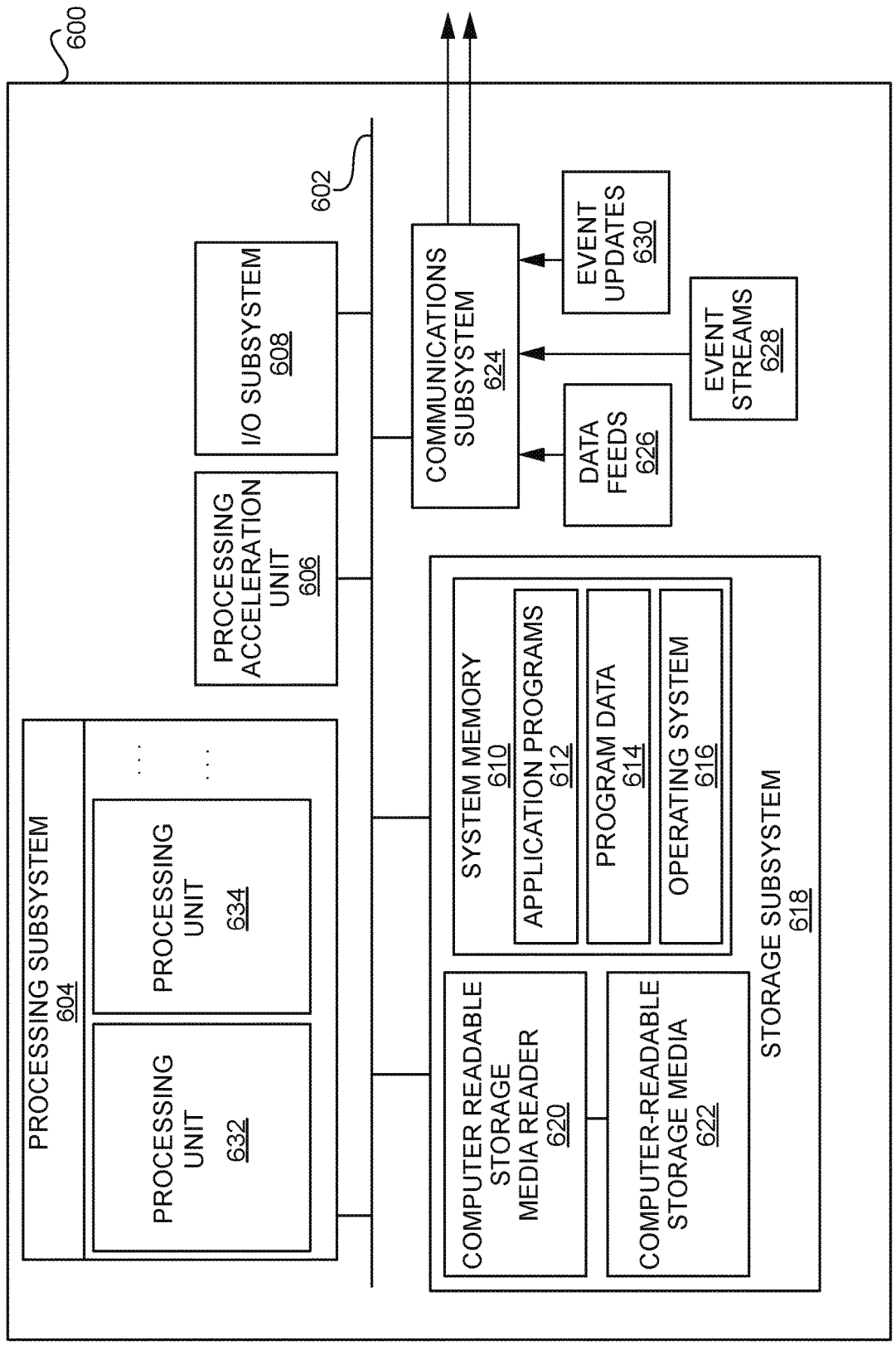
FIG. 6 illustrates an exemplary computer system that may be used to implement various embodiments.

FIG. 6 illustrates an exemplary computer system 600 that may be used to implement an embodiment of the present invention. In some embodiments, computer system 600 may be used to implement any of the various servers and computer systems described above. As shown in FIG. 6, computer system 600 includes various subsystems including a processing unit 604 that communicates with a number of peripheral subsystems via a bus subsystem 602. These peripheral subsystems may include a processing acceleration unit 606, an I/O subsystem 608, a storage subsystem 618 and a communications subsystem 624. Storage subsystem 618 may include tangible computer-readable storage media 622 and a system memory 610.

Bus subsystem 602 provides a mechanism for letting the various components and subsystems of computer system 600 communicate with each other as intended. Although bus subsystem 602 is shown schematically as a single bus, alternative embodiments of the bus subsystem may utilize multiple buses. Bus subsystem 602 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 604 controls the operation of computer system 600 and may comprise one or more processing units 632, 634, etc. A processing unit may include be one or more processors, including single core or multicore processors, one or more cores of processors, or combinations thereof. In some embodiments, processing subsystem 604 can include one or more special purpose co-processors such as graphics processors, digital signal processors (DSPs), or the like. In some embodiments, some or all of the processing units of processing subsystem 604 can be implemented using customized circuits, such as application specific integrated circuits (ASICs), or field programmable gate arrays (FPGAs).

In some embodiments, the processing units in processing subsystem 604 can execute instructions stored in system memory 610 or on computer readable storage media 622. In various embodiments, the processing units can execute a variety of programs or code instructions and can maintain multiple concurrently executing programs or processes. At any given time, some or all of the program code to be executed can be resident in system memory 610 and/or on computer-readable storage media 622 including potentially on one or more storage devices. Through suitable programming, processing subsystem 604 can provide various functionalities described above for dynamically modifying documents (e.g., webpages) responsive to usage patterns.

In certain embodiments, a processing acceleration unit 606 may be provided for performing customized processing or for off-loading some of the processing performed by processing subsystem 604 so as to accelerate the overall processing performed by computer system 600.

I/O subsystem 608 may include devices and mechanisms for inputting information to computer system 600 and/or for outputting information from or via computer system 600. In general, use of the term "input device" is intended to include all possible types of devices and mechanisms for inputting information to computer system 600. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as input into an input device (e.g., Google) Glass®. Additionally, user interface input devices may include voice recognition sensing devices that enable users to interact with voice recognition systems (e.g., Siri® navigator), through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 600 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 618 provides a repository or data store for storing information that is used by computer system 600. Storage subsystem 618 provides a tangible non-transitory computer-readable storage medium for storing the basic programming and data constructs that provide the functionality of some embodiments. Software (programs, code modules, instructions) that when executed by processing subsystem 604 provide the functionality described above may be stored in storage subsystem 618. The software may be executed by one or more processing units of processing subsystem 604. Storage subsystem 618 may also provide a repository for storing data used in accordance with the present invention.

Storage subsystem 618 may include one or more non-transitory memory devices, including volatile and non-volatile memory devices. As shown in FIG. 6, storage subsystem 618 includes a system memory 610 and a computer-readable storage media 622. System memory 610 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 600, such as during start-up, may typically be stored in the ROM. The RAM typically contains data and/or program modules that are presently being operated and executed by processing subsystem 604. In some implementations, system memory 610 may include multiple different types of memory, such as static random access memory (SRAM) or dynamic random access memory (DRAM).

By way of example, and not limitation, as depicted in FIG. 6, system memory 610 may store application programs 612, which may include client applications, Web browsers, mid-tier applications, relational database management systems (RDBMS), etc., program data 614, and an operating system 616. By way of example, operating system 616 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Computer-readable storage media 622 may store programming and data constructs that provide the functionality of some embodiments. Software (programs, code modules, instructions) that, when executed by processing subsystem 604 provides the functionality described above, may be stored in storage subsystem 618. By way of example, computer-readable storage media 622 may include non-volatile memory such as a hard disk drive, a magnetic disk drive, an optical disk drive such as a CD ROM, DVD, a Blu-Ray® disk, or other optical media. Computer-readable storage media 622 may include, but is not limited to, Zip® drives, flash memory cards, universal serial bus (USB) flash drives, secure digital (SD) cards, DVD disks, digital video tape, and the like. Computer-readable storage media 622 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. Computer-readable media 622 may provide storage of computer-readable instructions, data structures, program modules, and other data for computer system 600.

In certain embodiments, storage subsystem 600 may also include a computer-readable storage media reader 620 that can further be connected to computer-readable storage media 622. Together and, optionally, in combination with system memory 610, computer-readable storage media 622 may comprehensively represent remote, local, fixed, and/or removable storage devices plus storage media for storing computer-readable information.

In certain embodiments, computer system 600 may provide support for executing one or more virtual machines. Computer system 600 may execute a program such as a hypervisor for facilitating the configuring and managing of the virtual machines. Each virtual machine may be allocated memory, compute (e.g., processors, cores), I/O, and networking resources. Each virtual machine typically runs its own operating system, which may be the same as or different from the operating systems executed by other virtual machines executed by computer system 600. Accordingly, multiple operating systems may potentially be run concurrently by computer system 600. Each virtual machine generally runs independently of the other virtual machines.

Communications subsystem 624 provides an interface to other computer systems and networks. Communications subsystem 624 serves as an interface for receiving data from and transmitting data to other systems from computer system 600. For example, communications subsystem 624 may enable computer system 600 to establish a communication channel to one or more client devices via an Internet network for receiving and sending information from and to the client devices.

Communication subsystem 624 may support both wired and/or wireless communication protocols. For example, in certain embodiments, communications subsystem 624 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 624 can provide wired network connectivity (e.g., Ethernet) in addition to or instead of a wireless interface.

Communication subsystem 624 can receive and transmit data in various forms. For example, in some embodiments, communications subsystem 624 may receive input communication in the form of structured and/or unstructured data feeds 626, event streams 628, event updates 630, and the like. For example, communications subsystem 624 may be configured to receive (or send) data feeds 626 in real-time from users of social media networks and/or other communication services such as Twitter® feeds, Facebook® updates, web feeds such as Rich Site Summary (RSS) feeds, and/or real-time updates from one or more third party information sources.

In certain embodiments, communications subsystem 624 may be configured to receive data in the form of continuous data streams, which may include event streams 628 of real-time events and/or event updates 630, that may be continuous or unbounded in nature with no explicit end. Examples of applications that generate continuous data may include, for example, sensor data applications, financial tickers, network performance measuring tools (e.g. network monitoring and traffic management applications), click-stream analysis tools, automobile traffic monitoring, and the like.

Communications subsystem 624 may also be configured to output the structured and/or unstructured data feeds 626, event streams 628, event updates 630, and the like to one or more databases that may be in communication with one or more streaming data source computers coupled to computer system 600.

Computer system 600 can be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system.

Due to the ever-changing nature of computers and networks, the description of computer system 600 depicted in FIG. 6 is intended only as a specific example. Many other configurations having more or fewer components than the system depicted in FIG. 6 are possible. Based on the disclosure and teachings provided herein, a person of ordinary skill in the art will appreciate other ways and/or methods to implement the various embodiments.

Although specific embodiments of the invention have been described, various modifications, alterations, alternative constructions, and equivalents are also encompassed within the scope of the invention. Embodiments of the present invention are not restricted to operation within certain specific data processing environments, but are free to operate within a plurality of data processing environments. Additionally, although embodiments of the present invention have been described using a particular series of transactions and steps, it should be apparent to those skilled in the art that the scope of the present invention is not limited to the described series of transactions and steps. Various features and aspects of the above-described embodiments may be used individually or jointly.

Further, while embodiments of the present invention have been described using a particular combination of hardware and software, it should be recognized that other combinations of hardware and software are also within the scope of the present invention. Embodiments of the present invention may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for interprocess communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although various embodiments have been described, these are not intended to be limiting. Various modifications and equivalents are within the scope of the following claims.

What is claimed is:

1. A system comprising:
one or more processors; and
non-transitory machine readable storage medium coupled to the one or more processors, the non-transitory machine readable storage medium storing a plurality of instructions executable by the one or more processors, the plurality of instructions comprising instructions that when executed by the one or more processors cause the one or more processors to perform processing comprising:
executing, on a first computing system, an application that is configured to obtain information including data records from a database of a second computing system, wherein:
the first computing system runs a first operating system and the application is executed via the first operating system,
the second computing system runs a second operating system that is different from the first operating system,
the database stores one or more transaction logs, and
the information further includes change data of the data records obtainable from the one or more transaction logs;
sending, by the first computing system, a request to obtain the information from the database, wherein the request includes a function to execute a stored procedure or a user-defined function on the second computing system that performs a read of the change data of the data records obtainable from the one or more transaction logs, wherein the stored procedure or the user-defined function is a separately compiled application that is part of the database, wherein the stored procedure or the user-defined function is invoked by the application and executed on the second computing system, and wherein the stored procedure or the user-defined function exposes use of a interface function via one or more application program interfaces (APIs) for use remotely by the application to acquire access to and read the one or more transaction logs of the database; and
receiving, by the first computing system, the information obtained from the database.

2. The system of claim 1, wherein the stored procedure or the user-defined function is a two part procedure including a first stored procedure that initializes an extract process by gathering environmental information about the database and a second stored procedure that performs the read of the change data of the data records obtainable from the one or more transaction logs.

3. The system of claim 1, wherein the application is ORACLE® GoldenGate software package, and the first operating system is a UNIX, LINUX, or z/LINUX operating system.

4. The system of claim 3, wherein the database is DB2® database, and the second operating system is z/OS® operating system.

5. The system of claim 4, wherein the interface function is a Instrumentation Facility Interface (IFI) function identified as instrumentation facility component identifier (IFCID) 0306 for use remotely by the application to acquire access to and the read of the change data of the data records obtainable from the one or more transaction logs stored by the DB2® database.

6. The system of claim 1, further comprising program instructions to provision the stored procedure or the user-defined function on the second computing system, wherein the stored procedure or the user-defined function utilize Structured Query Language (SQL) statements and interfaces to communicate with the database.

7. The system of claim 1, further comprising program instructions to update a portion of the data records in a database instance based on the change data obtained from the one or more transaction logs.

8. A non-transitory machine readable storage medium having instructions stored thereon that when executed by one or more processors cause the one or more processors to perform a method comprising:
executing, on a first computing system, an application that is configured to obtain information including data records from a database of a second computing system, wherein:
the first computing system runs a first operating system and the application is executed via the first operating system,
the second computing system runs a second operating system that is different from the first operating system,
the database stores one or more transaction logs, and
the information further includes change data of the data records obtainable from the one or more transaction logs;
sending, by the first computing system, a request to obtain the information from the database, wherein the request includes a function to execute a stored procedure or a user-defined function on the second computing system that performs a read of the change data of the data records obtainable from the one or more transaction logs, wherein the stored procedure or the user-defined function is a separately compiled application that is part of the database, wherein the stored procedure or the user-defined function is invoked by the application and executed on the second computing system, and wherein the stored procedure or the user-defined function exposes use of a interface function via one or more application program interfaces (APIs) for use remotely by the application to acquire access to and read the one or more transaction logs of the database; and
receiving, by the first computing system, the information obtained from the database,
wherein the stored procedure or the user-defined function is invoked by the application and executed on the second computing system.

9. The non-transitory machine readable storage medium of claim 8, wherein the stored procedure or the user-defined function is a two part procedure including a first stored procedure that initializes an extract process by gathering environmental information about the database and a second stored procedure that performs the read of the change data of the data records obtainable from the one or more transaction logs.

10. The non-transitory machine readable storage medium of claim 8, wherein the application is ORACLE® GoldenGate software package, and the first operating system is a UNIX, LINUX, or z/LINUX operating system.

11. The non-transitory machine readable storage medium of claim 10, wherein the database is DB2® database, and the second operating system is z/OS® operating system.

12. The non-transitory machine readable storage medium of claim 11, wherein the interface function is an Instrumentation Facility Interface (IFI) function identified as instrumentation facility component identifier (IFCID) 0306 for use remotely by the application to acquire access to and the read of the change data of the data records obtainable from the one or more transaction logs stored by the DB2® database.

13. The non-transitory machine readable storage medium of claim 8, wherein the method further comprises provisioning the stored procedure or the user-defined function on the second computing system, wherein the stored procedure or the user-defined function utilize Structured Query Language (SQL) statements and interfaces to communicate with the database.

14. The non-transitory machine readable storage medium of claim 8, wherein the method further comprises updating a portion of the data records in a database instance based on the change data obtained from the one or more transaction logs.

15. A method comprising:
    executing, on a first computing system, an application that is configured to obtain information including data records from a database of a second computing system, wherein:
        the first computing system runs a first operating system and the application is executed via the first operating system,
        the second computing system runs a second operating system that is different from the first operating system,
        the database stores one or more transaction logs, and
        the information further includes change data of the data records obtainable from the one or more transaction logs;
    sending, by the first computing system, a request to obtain the information from the database, wherein the request includes a function to execute a stored procedure or a user-defined function on the second computing system that performs a read of the change data of the data records obtainable from the one or more transaction logs, wherein the stored procedure or the user-defined function is a separately compiled application that is part of the database, wherein the stored procedure or the user-defined function is invoked by the application and executed on the second computing system, and wherein the stored procedure or the user-defined function exposes use of a interface function via one or more application program interfaces (APIs) for use remotely by the application to acquire access to and read the one or more transaction logs of the database; and
    receiving, by the first computing system, the information obtained from the database,
    wherein the stored procedure or the user-defined function is invoked by the application and executed on the second computing system.

16. The method of claim 15, wherein the stored procedure or the user-defined function is a two part procedure including a first stored procedure that initializes an extract process by gathering environmental information about the database and a second stored procedure that performs the read of the change data of the data records obtainable from the one or more transaction logs.

17. The method claim 16, wherein the application is ORACLE® GoldenGate software package, and the first operating system is a UNIX, LINUX, or z/LINUX operating system.

18. The method of claim 17, wherein the database is DB2® database, and the second operating system is z/OS® operating system.

19. The method of claim 18, wherein the interface function is an Instrumentation Facility Interface (IFI) function identified as instrumentation facility component identifier (IFCID) 0306 for use remotely by the application to acquire access to and the read of the change data of the data records obtainable from the one or more transaction logs stored by the DB2® database.

\* \* \* \* \*

UNITED STATES PATENT AND TRADEMARK OFFICE
CERTIFICATE OF CORRECTION

PATENT NO. : 10,803,048 B2  
APPLICATION NO. : 15/707114  
DATED : October 13, 2020  
INVENTOR(S) : Johnston Page 1 of 1

It is certified that error appears in the above-identified patent and that said Letters Patent is hereby corrected as shown below:

In the Specification

In Column 7, Line 15, delete "z/LINUZ OS," and insert -- z/LINUX OS, --, therefor.

In Column 7, Line 18, delete "z/LINUZ OS" and insert -- z/LINUX OS --, therefor.

In Column 10, Line 3, delete "alternatives" and insert -- alternatives. --, therefor.

In Column 21, Line 37, delete "(e.g., Google) Glass®." and insert -- (e.g., Google Glass®). --, therefor.

In the Claims

In Column 28, Line 24, in Claim 17, after "method" insert -- of --.

Signed and Sealed this  
Eleventh Day of May, 2021

Drew Hirshfeld  
*Performing the Functions and Duties of the*  
*Under Secretary of Commerce for Intellectual Property and*  
*Director of the United States Patent and Trademark Office*